United States Patent [19]

Rawlings et al.

[11] 4,097,435

[45] Jun. 27, 1978

[54] GLASS-FILLED POLYCARBONATE OF IMPROVED DUCTILITY

[75] Inventors: Herbert L. Rawlings; Arthur L. Baron, both of New Martinsville, W. Va.

[73] Assignee: Mobay Chemical Corporation, Pittsburgh, Pa.

[21] Appl. No.: 786,308

[22] Filed: Apr. 11, 1977

[51] Int. Cl.$^2$ .......................... C08K 7/14; C08K 5/10
[52] U.S. Cl. .............................. 260/28 R; 260/37 PC
[58] Field of Search ........... 260/28 R, 37 PC, 18 TN, 260/31.6; 428/412

[56] References Cited

U.S. PATENT DOCUMENTS

| 3,274,144 | 9/1966 | Keskkula et al. | 260/18 TN |
| 3,488,317 | 1/1970 | Hechelhammer et al. | 260/37 PC |
| 3,578,621 | 5/1971 | Stapfer | 260/31.6 |
| 3,784,595 | 1/1974 | Schirmer et al. | 260/37 PC |
| 3,864,295 | 2/1975 | Boussely | 260/28.5 D |

FOREIGN PATENT DOCUMENTS 47-41092  10/1972  Japan.

*Primary Examiner*—V. P. Hoke
*Attorney, Agent, or Firm*—Gene Harsh; Lawrence S. Pope; Frederick H. Colen

[57] ABSTRACT

A glass-fiber reinforced aromatic polycarbonate is provided with improved ductility and improved mold release properties which is comprised of an aromatic polycarbonate resin, glass-fibers and an ester wax of montanic acid.

11 Claims, No Drawings

GLASS-FILLED POLYCARBONATE OF IMPROVED DUCTILITY

FIELD OF THE INVENTION

This invention relates to polycarbonates and more particularly to glass-filled aromatic polycarbonates containing ester waxes from montanic acid.

BACKGROUND OF THE INVENTION

Polycarbonates derived from reactions involving organic dihydroxy compounds and carbonic acid derivatives have found extensive commercial application because of their excellent mechanical and physical properties. These thermoplastic polymers are particularly suited for the manufacture of molded products where impact strength, rigidity, toughness, thermal stability, dimensional stability as well as excellent electrical properties are required.

In comparison to non-reinforced polycarbonates, glass fiber reinforced polycarbonates have both substantially increased flexural strength and stiffness and a substantially increased E-modulus, but have a decreased impact strength, notched impact strength and elongation at break. This degradation in impact and other physical properties is thought to be attributable to the formation of stress concentrations in the vicinity of the individual glass fibers causing propagation of cracks in the molded articles.

Furthermore, polycarbonates are outstandingly ductile thermoplastic polymers, but become relatively brittle upon incorporation of small amounts of glass fiber reinforcement. As the amount of glass fibers incorporated into the polycarbonate increases, not only does the brittleness of the polycarbonate remain apparent, but the glass fiber reinforced polycarbonate becomes increasingly difficult to demold from injection mold cavities.

In accordance with the present invention, glass-fiber reinforced aromatic polycarbonates are provided with improved ductility and improved mold release properties.

SUMMARY OF THE INVENTION

A glass-fiber reinforced aromatic polycarbonate is provided with improved ductility and improved mold release properties which is comprised of an aromatic polycarbonate resin, glass-fibers and an ester wax of montanic acid. The ester wax of montanic acid is derived from the naturally occurring montan wax.

DETAILED DESCRIPTION OF THE INVENTION

When used herein, the term "aromatic polycarbonate resin" means the neat resin without additives and the term "aromatic polycarbonate" means both the formulated aromatic polycarbonate resin with additives therein and also the final molded plastic product.

The aromatic polycarbonate resins useful in practice of the invention are produced by reacting di-(monohydroxyaryl)-alkanes or dihydroxybenzenes and substituted dihydroxybenzenes with derivatives of carbonic acid such as carbonic acid diesters, phosgene, bis-chloro-carbonic acid esters of di-(monohydroxyaryl)-alkanes and the bis-chloro-carbonic acid esters of the dihydroxybenzenes and the substituted dihydroxybenzenes.

By aromatic polycarbonate resin, in the sense of the present invention, there are understood homopolycarbonate and copolycarbonate resins which are based, for example, on one or more of the following bisphenols: hydroquinone, resorcinol, dihydroxydiphenyls, bis-(hydroxyphenyl)-alkanes, bis-(hydroxyphenyl)-cycloalkanes, bis-(hydroxyphenyl)sulphides, bis-(hydroxyphenyl)-ethers, bis-(hydroxyphenyl)ketones, bis-(hydroxyphenyl)-sulphoxides, bis-(hydroxyphenyl)-sulphones and α,α-bis-(hydroxyphenyl)-diisopropylbenzenes, as well as their nuclear-alkylated and nuclear-halogenated compounds. These and further suitable aromatic dihydroxy compounds are described, for example, in U.S. Pat. Nos. 3,028,365, 2,999,835, 3,148,172, 3,271,368, 2,991,273, 3,271,367, 3,280,078, 3,014,891 and 2,999,846 (all incorporated herein by reference) in German Offenlegungsschriften (German Published Specifications) Nos. 1,570,703, 2,063,050, 2,063,052, 2,211,956 and 2,211,957, in French Patent Specification 1,561,518 and in the monograph "H. Schnell, Chemistry and Physics of Polycarbonates, Interscience Publishers, New York, 1964."

Preferred bisphenols are those of the formula I

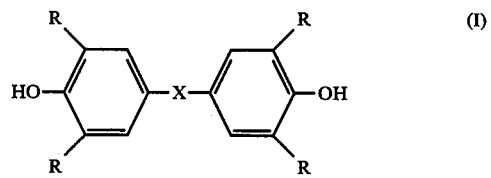

in which
R is identical or different and denotes H, $C_1$-$C_4$-alkyl, Cl or Br
and in which
X is a bond, $C_1$-$C_8$-alkylene, $C_2$-$C_8$-alkylidene, $C_5$-$C_{15}$-cycloalkylene, $C_5$-$C_{15}$-cycloalkylidene, —$SO_2$—, —SO—, —CO— or

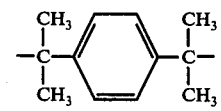

Examples of these bisphenols are: 4,4'-dihydroxydiphenyl, 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)sulphone, 2,4-bis-(3,5-dimethyl-4-hydroxyphenyl)-2-methylbutane, 1,1-bis-(3,5-dimethyl-4-hydroxyphenyl)-cyclohexane, α,α-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane (tetrabromo bisphenol A) propane.

Examples of particularly preferred bisphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)propane and 1,1-bis-(4-hydroxyphenyl)-cyclohexane.

Preferred aromatic polycarbonate resins are those which are based on one or more of the bisphenols mentioned as being preferred. Particularly preferred copolycarbonate resins are those based on 2,2-bis-(4-hydroxyphenyl)-propane and one of the other bisphenols mentioned as being particularly preferred. Further particularly preferred polycarbonate resins are those based solely on 2,2-bis-(4-hydroxyphenyl)propane or 2,2-bis-(3,5-dimethyl-4-hydroxyphenyl)-propane.

The aromatic high-molecular weight polycarbonate resins can be branched due to the incorporation of small amounts, preferably of between about 0.05 and 2.0 mol % (relative to diphenols employed), of trifunctional or more than trifunctional compounds, especially compounds with three or more phenolic hydroxyl groups. Polycarbonate resins of this type are described, for example, in German Offenlegungsschriften (German Published Specifications) Nos. 1,570,533, 1,595,762, 2,116,974 and 2,113,347, British Patent Specification No. 1,079,821 and U.S. Pat. No. 3,544,514 (incorporated herein by reference).

Some examples of compounds with three or more than three phenolic hydroxyl groups which can be used are phloroglucinol, 4,6dimethyl-2,4,6-tri-(4-hydroxyphenyl)-heptane-2,4,6-dimethyl-2,4,6-tri-(4-hydroxyphenyl)-heptane, 1,4,5-tri(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)propane, hexa(4-(4-hydroxyphenylisopropyl)phenyl) orthoterephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)-methyl)-benzene. Some of the other trifunctional compounds are 2,4-dihydroxybenzoic acid, trimesic acid, cyanuric chloride and 3,3-bis-(4-hydroxyphenyl)-2-oxo-2,3-dihydroindole.

The polycarbonate resins are preferably those having a weight average molecular weight from about 10,000 to 200,000, most preferably about 20,000 to 80,000, and preferably a melt flow rate range of about 1 to 24 g/10 min (ASTM 1238) and are prepared by methods known to those skilled in the art and more particularly by methods disclosed in U.S. Pat. Nos. 3,028,365, 2,999,846, 3,248,414, 3,153,008, 3,215,668, 3,187,065, 2,964,794, 2,970,131, 2,991,273 and 2,999,835, all incorporated herein by reference.

The ester waxes of montanic acid of the invention are present in the polycarbonate in an amount of about 0.1 to 2 percent by weight, preferably about 0.35 to 0.70 percent by weight, based on the weight of the total composition.

The ester waxes of montanic acid are derived from montan wax which is naturally occurring in nature. Montan wax is a bituminous wax occurring in brown coals or lignites from which it can readily be extracted. Wax-containing brown coals have been mined in Australia, New Zealand, Czechoslovakia, Russia and the U.S. (California and Arkansas), in addition to the main source of supply in central Germany, where its extraction and processing is an old and established industry. The crude montan wax is complex chemically, but its composition is similar to other natural waxes.

The crude montan wax is dark brown and melts at about 76° to 92° C. It is primarily an ester wax, nearly 60% esters, but also has a substantial free acid content which is likely to be in excess of 15%. The total carbon chain length of the acids and alcohols in the crude wax is 26 – 32 carbon atoms and 26 carbon atoms, respectively. There probably are some hydroxy acid esters present in the crude montan wax, and there may be some odd-numbered fatty acids in the $C_{27}$–$C_{31}$ range, either free or combined. In addition to a resin content of 1–12%, a $C_{28}$–$C_{30}$ ketone content of up to 10% is frequently reported in crude montan wax.

The dark brown, crude montan wax can be refined by known procedures into a pale acid wax having an acid number of about 10–20 (DGF Einheitsmethoden M-IV,2(57))* and a saponification number of about 100-160 (DGF Einheitsmethoden M-IV, 2(57))** by means of various oxidizing agents of which chromic acid has proved the most suitable, the wax molecule being modified to a very great extent. When the natural, crude montan wax is hydrolyzed, free alcohols are formed, but are reoxidized to acids by the oxidizing agent. Dicarboxylic acids are oxidized from the hydroxy carboxylic acids and their esters present in the crude wax. They may be present in the newly formed acid wax in proportions of up to 30%. By esterification with long-chain fatty alcohols or low-molecular weight glycols, the montanic acid waxes are converted into the montanic ester waxes useful in the present invention. By the appropriate choice of alcohols and glycols or by subsequent neutralization of non-esterified acids, a wide variety of montanic acid ester waxes may be provided.

* Similar to ASTM D-1386-59 but modified by using a 2:1 xylene: ethanol solvent system instead of a 1:2 toluene/ethanol solvent system.
** Similar to ASTM D-1387-59 but modified by using a 2:1 xylene: ethanol solvent system instead of a 1:2 toluene/ethanol solvent system.

The montanic acid ester waxes useful in the present invention are commercially available, such as Hoechst E-wax and Hoechst OP-wax.

The preferred montanic acid ester waxes useful in the present invention have an acid number of between about 15–20 and a saponification number between about 140–160 and consist essentially of esters of the general formula:

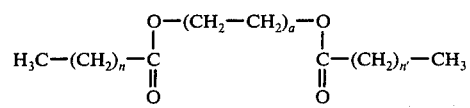

wherein $n$ and $n'$ may be the same or different and are between 25 and 31 inclusive and $a$ is between 1 and 13 inclusive, preferably 1. Hoechst E-Wax is such a preferred montanic acid ester wax.

In a preferred embodiment of the present invention, the glass-filled polycarbonate may contain a sufficient quantity of pigment to opacify the glass-filled polycarbonate in addition to containing ester waxes derived from montanic acid.

Suitable pigments used to opacify and color the polycarbonate are those conventionally known to skilled artisans for use in high molecular weight thermoplastic pigmentation. By far, titanium dioxide is the most preferred pigment to opacify and whiten molded articles because of its high index of refraction, extreme whiteness and brightness. However, other white pigments such as lithopone, zinc sulfide, zinc oxide, antimony trioxide, and the like may be used. To impart color (other than white) to the polycarbonate pigments such as red lead, cuprous oxide, cadmium reds, cinnabar, antimony vermilion (red and brown pigments); zinc yellow, chrome yellows and oranges, cadmium yellow, antimony yellow, (orange and yellow pigments); chrome greens, chrome oxide greens (green pigments); cobalt blue, iron blues (blue pigments); lampblacks, vegetable blacks, animal blacks (black pigments) and the like may be used.

In addition to the inorganic pigments, recited above, organic pigments may be used such as pigment chlorine, lithol fast yellow toluidine red, permanent orange and the like. Dyes may be added to impart color to the polycarbonate such as the phthalocyanines, the anthraquinones and the like.

Particular examples of suitable pigments include Pigment Blue 15 (C.I. 74160), Diluted Black-PDS 161 B-192 (Kohnstamm), Solvent Violet 13 (C.I. 60725), Yellow 37 (C.I. 77199), Cadmium Red (C.I. 77196), Croton Fast Green Toner 4D-3600 (Harshaw Chemical Co.), Amaplast Yellow GHS (Drakenfeld), PDS 987 Thermax Blue-Black (Kohnstamm), Marine Blue (Drakenfeld), Scarlet Red 10177 (Drakenfeld), Scarlet Red 10051 (Drakenfeld), phthalocyanine pigments such as, for example, copper phthalocyanine (Monastral Fast Blue B or Heliogen Blue BA), chlorinated copper phthalocyanine (Monastral Fast Green G or Heliogen Green GA), sulfonated copper phthalocyanine and metal free phthalocyanine (Monastral Fast Blue G).

The pigment is incorporated into the polycarbonate at a level of about 1 to 18 grams, preferably 2 to 8 grams, of pigment per pound of polycarbonate resin. The above ranges are sufficient to acceptably opacify the polycarbonate and any articles made from the polycarbonate of the present invention.

Glass fibers which can be used to prepare the polycarbonate compositions are, for example, fibers of low-alkali, aluminum-borosilicate glass having a maximum alkali metal oxide content of 2.0% by weight (E-glass), of diameter between 8–15 μ length between 300 and 800 μ (short glass fibers) or 2,000 to 12,000 μ (chopped strands) as well as rovings. The glass fibers are present in the polycarbonate in from about 5 to 40% by weight, preferably, about 10 to 30% by weight, based on the weight of the total composition.

To prepare molding compositions according to the present invention, the individual components are mixed in known mixing devices, such as kneaders, single-screw extruders, twin-screw extruders, mills and the like.

In a preferred embodiment, the aromatic polycarbonate resin, an ester wax of montanic acid and optionally pigment, are preblended and the glass fibers are subsequently added to the preblend. The entire mixture is further blended and then extruded.

During the blending process, it is possible to admix additional additives such as stabilizers, flame retardant agents, flow agents, lubricants and antistatic agents in a known manner.

The invention will further be illustrated, but is not intended to be limited, by the following examples.

EXAMPLES

Example 1

9.39 lbs. of a bisphenol-A polycarbonate having a melt flow rate of about 12.1 gms./10 min. at 300° C (ASTM D 1238) was tray-dried overnight at 110° C. The polycarbonate resin in the form of hot pellets was mixed with 3.26 grams of a phosphite-based stabilizer and the mixture was blended for 2½ minutes in a 5 gallon stainless steel drum and then cooled to 55° C. 5.4 grams of a flame retardant perfluoroalkane sulphonic acid salt and 65.3 grams of a grey colorant mixture were then added to the stabilized polycarbonate and the mixture was blended for an additional 2½ minutes. 2.4 lbs. (20% by weight) of 3/16 inch long glass fibers were added next and the mixture was blended for an additional 1½ minutes. The mixture was then extruded in a single screw extruder equipped with a 2.75:1 compression screw and four rows of mixing pins. The temperature profile of extrusion was:

| Rear Zone | Middle Zone | Front Zone | Die | Screens | Melt Temperature |
|---|---|---|---|---|---|
| 540° F | 450° F | 455° F | 520° F | none | 480° F |

The extruder strands were pelletized and ⅛ inch thick standard samples were molded for evaluation of physical properties.

Ductility (drop dart impact strength) was measured by dropping a 10.4 lb. weight with a contact surface of a 1 inch diameter hemisphere upon a ⅛ inch thick, 4 inch diameter securely clamped, molded specimen. The drop height corresponding to a 50% breakage of the specimen was proportional to the ductility of the test specimen.

The ease of release from the mold was determined subjectively by observing the ejection of test specimens from the mold.

The ductility (drop dart impact resistance), ease of mold release, and additional physical properties of the composition of Example 1 and the additional Examples are reported in the following Table 1.

Example 2

A polycarbonate composition was prepared by the method of Example 1 except that 19 grams (0.35% by weight based on the total composition) of the stearyl ester of behenic acid (Henkel International, GMBH Loxiol G-47) was blended with the components used in Example 1.

Example 3

A polycarbonate composition was prepared by the method of Example 1 except that 19 grams (0.35% by weight based on the total composition) of an ester wax of montanic acid (Hoechst E-Wax) was blended with the components of Example 1.

Example 4

A polycarbonate composition was prepared by the method of Example 1 except that 38 grams (0.70% by weight based on the total composition) of an ester wax of montanic acid (Hoechst E-Wax) was blended with the components of Example 1.

Example 5

A polycarbonate composition was prepared by the method of Example 1 except that 19 grams (0.35% by weight based on the total composition) of a partly saponified ester wax of montanic acid (Hoechst OP wax) was blended with the components of Example 1.

TABLE 1

| Example | Additive | Concentration (wt. %) | Drop Dart (ft. lb.) | Flexural Modulus (PSI × 10$^5$) | Flexural Strength (PSI × 10$^3$) | Ease Of Mold Release |
|---|---|---|---|---|---|---|
| 1 | None | None | 4.7 | 8.2 | 16.8 | Poor-must use external mold release agent |
| 2 | The stearyl ester of behenic acid (Loxiol G-47) | 0.35 | 19.7 | 7.9 | 16.1 | Minor sticking to mold |
| 3 | Ester wax of montanic acid (Hoechst E-Wax) | 0.35 | 29.6 | 8.3 | 15.8 | Minor sticking to mold |
| 4 | Ester wax of montanic acid (Hoechst E-Wax) | 0.70 | 27.6 | 8.3 | 15.3 | Minor sticking to mold |
| 5 | Partly saponified ester wax of montanic acid (Hoechst OP Wax) | 0.35 | 9.6 | 8.4 | 16.7 | Minor sticking to mold |

The data in Table 1 demonstrates that the addition of an ester wax of montanic acid to an aromatic polycarbonate composition results in ductility and mold release properties superior to those properties encountered in a polycarbonate composition containing no internal mold release agent and that the addition of the applicants' preferred ester wax of montanic acid (Hoechst E-Wax) used in Examples 3 and 4 to an aromatic polycarbonate results in ductility and mold release properties superior to those properties exhibited in a polycarbonate composition containing a known mold release-agent (Loxiol G-47) as an internal mold release agent.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polycarbonate molding composition comprising
   (a) an aromatic polycarbonate resin,
   (b) about 5 to 40% by weight, based upon the total composition, of glass fibers, and
   (c) about 0.1 to 2% by weight, based upon the total composition, of an ester wax of montanic acid made by esterifying said acid with a fatty alcohol or a low molecular weight glycol, said alcohol or glycol having upto and including 26 carbon atoms.

2. The molding composition of claim 1 wherein about 10 to 30% by weight, based upon the total composition, of glass fibers and about 0.35 to 0.70% by weight, based upon the total composition, of an ester wax of montanic acid is present.

3. The molding composition of claim 1 wherein sufficient pigment to opacify the polycarbonate resin is present.

4. The molding composition of claim 3 wherein the pigment is present in amounts of from about 1 to 18 grams per pound of aromatic polycarbonate.

5. The molding composition of claim 1 wherein the ester wax of montanic acid consists essentially of esters of the general formula

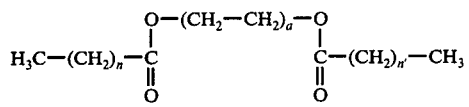

wherein $n$ and $n'$ may be the same or different and are between 25 and 31 inclusive, and $a$ is between 1 and 13 inclusive.

6. The molding composition of claim 5 wherein $a$ is 1.

7. The molding composition of claim 1 wherein the aromatic polycarbonate resin comprises the reaction product of bisphenol-A and phosgene.

8. The molding composition of claim 1 wherein the aromatic polycarbonate resin comprises the reaction product of bisphenol-A, tetrabromobisphenol-A and phosgene.

9. The molding composition of claim 1 wherein the aromatic polycarbonate resin has a weight average molecular weight of from about 10,000 to 200,000 and a melt flow rate range of about 1 to 24 g/10 min. (ASTM D 1238).

10. A process for improving the ductility and mold release properties of a polycarbonate comprising melt blending:
   (a) an aromatic polycarbonate resin,
   (b) about 5 to 40% by weight, based on the total composition of glass fibers, and
   (c) about 0.1 to 2% by weight, based upon the total composition, of an ester wax of montanic acid made by esterifying said acid with a fatty alcohol or a low molecular weight glycol, said alcohol or glycol having upto and including 26 carbon atoms.

11. The process of claim 10 wherein about 1 to 18 grams of pigment per pound of aromatic polycarbonate are included.

* * * * *